INVENTOR.
Edwin C. Montgomery
BY Collins & Oberlin
ATTORNEYS

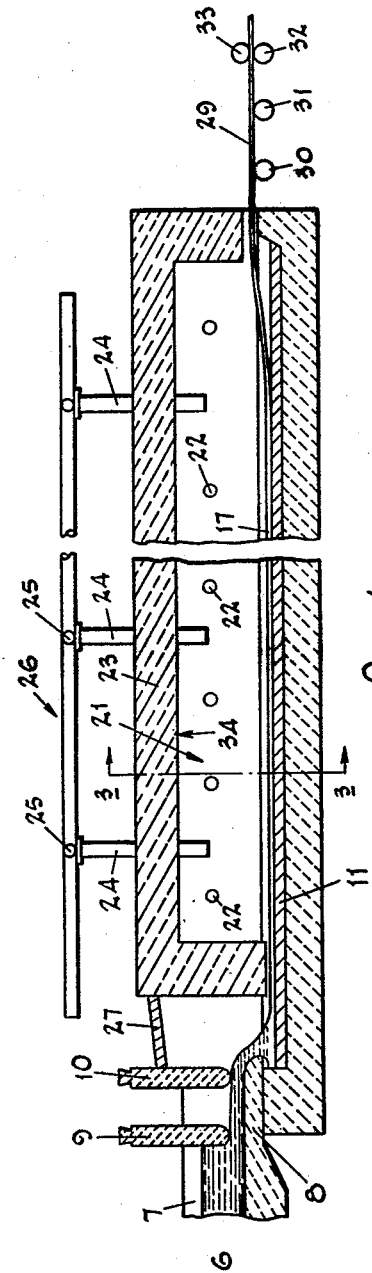

United States Patent Office 3,494,754
Patented Feb. 10, 1970

3,494,754
METHOD AND APPARATUS FOR PREVENTING FLOAT GLASS DEFECTS
Eldwin C. Montgomery, Modesto, Calif., assignor to Libbey-Owens-Ford Glass Company, Toledo, Ohio, a corporation of Ohio
Filed Oct. 30, 1967, Ser. No. 678,953
Int. Cl. C03b 39/00
U.S. Cl. 65—26                                        4 Claims

ABSTRACT OF THE DISCLOSURE

A method of preventing float glass defects, resulting from molten metal dripping onto the glass ribbon being advanced over the bath of molten metal in a float glass forming apparatus, which involves covering the molten metal of the float bath at either side of the glass ribbon with a layer of a material that will not adversely affect either the glass in the ribbon or the metal in the bath, and that may be a carbonaceous material, in finely divided form, floated on the bath and replenished by feeding the same into and beneath the surface of the molten bath, or in the form of cloth or felt.

BACKGROUND OF THE INVENTION

Field of the invention

The present invention relates to the manufacture of float glass and more particularly to a method and apparatus for preventing defects in the finished glass that have resulted from condensation and agglomeration of molten metal evaporating from areas of the float bath exposed to the float atmosphere.

Description of the prior art

While the production of float glass, as a commercial product, is relatively new, it is already being manufactured by some of the major glass companies, and a conventional form of float glass forming apparatus is illustrated and described in U.S. Patent No. 3,083,551, granted Apr. 2, 1963. As there explained, the manufacture of float glass by the float process involves delivering glass at a controlled rate onto a bath of molten metal and advancing it along the surface of the bath under physical and thermal conditions which assure (1) that a layer of molten glass will be established on the bath, (2) that the glass in the layer can flow laterally unhindered to develop on the surface of the bath a buoyant body of molten glass of stable thickness, and (3) that the buoyant body in ribbon form will be continuously advanced along the bath and sufficiently cooled as it advances to permit it to be taken unharmed out of the bath by mechanical conveying means.

Above the float bath of molten metal a tightly enclosed head space or plenum chamber is provided to contain the so-called float atmosphere.

Since one of the advantages of float glass is that it is formed with the desired surface finish, and so need not be ground and polished, successful commercial operation of the float process requires that no foreign matter of any kind be permitted to adhere to or accumulate on the upper or exposed surface of the float glass ribbon.

However, as heretofore practiced, considerable difficulty has been experienced from so-called "tin drops" which fall or drip from the ceiling of the plenum chamber onto the surface of the hot glass ribbon and which have resulted in actual production losses as high as 40% in some instances.

SUMMARY

According to this invention, such metal drop type defects are eliminated by providing a cover for the molten metal of the float bath, at either side of the glass ribbon being advanced thereover, to reduce, if not to completely prevent, evaporation of metal from previously exposed surface areas of the bath.

BRIEF DESCRIPTION OF THE DRAWINGS

In the drawings, wherein like numerals are employed to designate like parts throughout the same:
FIG. 1 is a longitudinal, vertical, sectional view through a representative type of float glass forming machine equipped with the bath covers of the invention;
FIG. 2 is a plan view of the apparatus of FIG. 1 with the plenum chamber removed.

DESCRIPTION OF THE PREFERRED EMBODIMENTS

Figure 3:
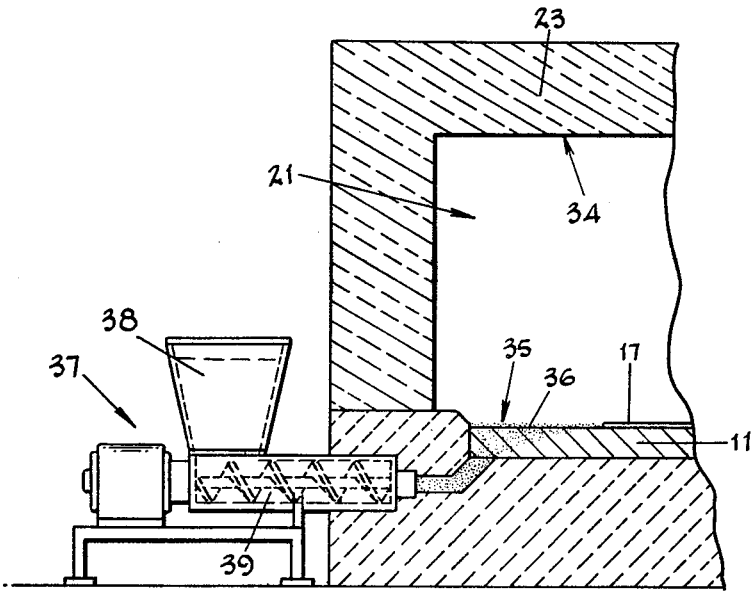
FIG. 3 is a transverse, vertical, sectional view taken substantially along the line 3—3 in FIG. 1 and showing a preferred form of bath cover.

Referring now more particularly to the drawings, there is illustrated in FIGS. 1 and 2 a typical float glass machine similar to the one disclosed in U.S. Patent 3,083,551. In this apparatus molten glass 6 is supplied from a forehearth 7 to a spout lip 8 in an amount regulated and controlled by a tweel 9 and a gate 10.

The glass flowing from the spout 8 onto the relatively wide metal bath 11 forms a buoyant molten body indicated at 16 and a buoyant layer of stable thickness 17 develops therefrom.

The metal bath (which may be of tin) in the tank structure, and the head space 21 over the bath, are heated by radiant heat directed downwardly from heaters 22 and this headspace 21, which contains the "float atmosphere," is enclosed by a roof structure or plenum chamber 23 which, with extension 27, makes it possible to maintain a sufficient volume of protecting gas over that part of the metal bath 11 that is exposed at each side of the glass in the float chamber. The roof structure 23 is provided at intervals with ducting 24 connected by branches 25 to headers 26 through which the protecting gas is fed into the headspace 21 at a rate to create a plenum therein. The protecting gas is one which will not chemically react with tin to produce contaminants of the glass (for example, a mixture of nitrogen and hydrogen) and, by providing a plenum ingress to the headspace 21, entrance of atmospheric air is theoretically prevented.

When the ultimate ribbon 29 is to be of substantially the same thickness as the equilibrium or stable thickness of the glass the temperature of the glass in the buoyant layer or ribbon 17 must be carefully controlled so as to progressively cool it from the tweel 9 to the discharge end of the apparatus by which time the ribbon surface should reach a temperature at which it is sufficiently stiffened to allow its transfer to a lehr on mechanical conveying means without detriment to the surfaces, e.g., about 650° C. at which the viscosity is about $10^7$ poises.

One type of mechanical conveying means that can be used includes supporting rollers 30 to 32 and superimposed roller 33 mounted outside of the discharge end of the tank. Any or all of the rollers 30 to 33 may be driven and cooperate to apply a tractive effort to the ribbon of glass moving towards the outlet end sufficient to advance it along the bath.

When a ribbon of less than equilibrium thickness is desired, this can be obtained by increasing the speed of the rolls 30 to 33 and thereby modifying their tractional effort and attenuating the molten glass body 17 of stable thickness.

In any event float glass forming apparatus of this character, as heretofore operated, produced glass ribbons having droplets of metal on and/or embedded in their upper surfaces, creating defects that resulted in the rejection of sizeable areas of the ribbon for commercial use. As indicated above, such defects were caused by metal dripping from the ceiling 34 of the plenum chamber onto the glass ribbon being advanced over the molten bath 11 and resulted in seriously high if not prohibitive production losses.

Now applicant has determined that this metal drip was due to evaporation of the molten metal from the heretofore exposed areas of the float bath that lay to either side of the glass ribbon and which condensed or deposited in the pore spaces of the exposed refractory surfaces inside the plenum chamber. After a time the metal concentration became heavy enough to agglomerate and fall or drip, particularly from the ceiling of the plenum chamber, onto the glass ribbon advancing therethrough; and it will be noted (FIG. 2) that the area of exposed metal was greatest in the hot end of the apparatus, where the buoyant body of glass 16 is developing into the buoyant layer or ribbon 17 of equilibrium thickness, and where the glass was hottest and most fluid and so more susceptible to permanent injury from the dripping metal.

With this as a basis, applicant has discovered that evaporation of metal from the bath 11 can be greatly reduced and the resultant dripping of metal practically eliminated, by covering the float bath at either side of the advancing ribbon of glass as shown at 35 in FIG. 2.

The cover 35 may be formed and positioned in any desired manner so long as it is in sufficiently close proximity to the surface of the bath 11 to retard evaporation therefrom. It can be of any material that will not injuriously affect either the glass in the ribbon or the metal in the bath at float temperature and when located in the required position relative thereto. Also, the cover materials may be used in any form in which they are available that lends itself to being located in an advantageous position in relation to the bath and ribbon.

For example, one of the most practicable covers employed to date has been a layer of granular carbon 36 (FIG. 3) which is floated on the molten bath 11 at either side of the ribbon 17. In thicknesses approximating the thickness of the exposed part of the float glass ribbon, this material effectively eliminates objectionable metal drip from the ceiling 34 of the plenum chamber 23. At the same time, since carbon is a reducing agent, it improves the float atmosphere conditions within the plenum chamber by counteracting the deleterious effects of air leakage into the chamber. Nevertheless, other finely divided materials that are sufficiently inert to the glass in the ribbon and the metal in the bath at float temperatures can be satisfactorily employed, as can other types of carbonaceous materials such as powdered graphite, lamp black and the like.

When the cover 35 is a layer of finely divided material, floatable on the bath surface, it is desirable to replenish the material in the layer to compensate for losses incident to the float ribbon's being withdrawn from the plenum chamber as it advances. This can be done continuously, and while avoiding contamination of the float atmosphere, by a subsurface feeding apparatus such as indicated at 37 in FIG. 2 and which is there shown as comprising a hopper 38 and a horizontal screw type conveyor 39 driven from a suitable source of power (not shown). By arranging a number of these along the length and at opposite sides of the bath and maintaining a supply of finely divided covering material in the hoppers 38, the material will be continuously fed in required amounts through the wall of the bath tank into the molten bath 11, and will float to the surface to replenish the layer 36.

Figure 4:
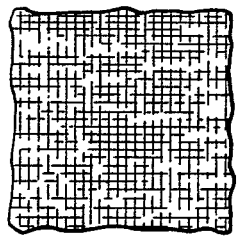
FIG. 4 is a fragmentary plan view of a modified form of the cover of the invention.
Figure 5:
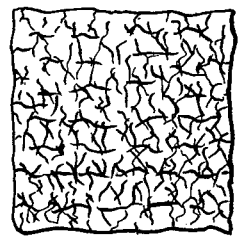
FIG. 5 is a view similar to FIG. 4, illustrating another modified form of bath cover.

In lieu of a layer of finely divided material, the cover 35 may comprise a fibrous layer of a material or materials possessing the essential properties outlined above and which may be in woven, cloth-like form, such as shown in FIG. 4, or in matted or felt-like form as illustrated in FIG. 5. Examples of these are the carbon and graphite felts and cloth produced by National Carbon Company for use in high temperature furnace insulation.

The advantage of substantially monolithic covers of this character is that they can be more readily and precisely located in relation to the float bath and ribbon to adequately cover the previously exposed portions of the bath surface while, if desired, maintaining the cover out of frictional contact with the advancing ribbon. Also, such covers may be either floated on the bath or mounted in slightly spaced relation thereto and in or out of contact and/or overlapping relationship to the ribbon.

It will be apparent from this that the covers of the invention may be employed to completely or to only partially cover the width of the bath surface lying outwardly of the float ribbon. Similarly they may cover this portion of the surface from one end to the other of the bath or may be confined to selected portions along its length where the problems arising from metal evaporation are most troublesome.

What is claimed is:

1. In a method of producing float glass in which a ribbon of glass is floated on and advanced over a bath of molten metal of greater width than said ribbon in a float chamber containing a confined atmosphere, the improvement comprising the steps of covering the surface of said bath at either side of said ribbon with a layer of finely divided carbonaceous material floated on said bath to prevent dripping of metal evaporating from said bath onto said ribbon, and feeding additional amounts of said material into said bath below the surface thereof to replenish said material and maintain said layer.

2. A method of producing float glass as claimed in claim 1, wherein said additional amounts of material are fed into said bath below the surface thereof at a plurality of points spaced throughout the length of said bath.

3. In apparatus for forming float glass including a tank, a bath of molten metal in said tank upon which a glass ribbon of lesser width than said bath is floated and advanced, and a float chamber positioned over said bath and confining a float atmosphere thereabove, the improvement comprising a cover layer of finely divided carbonaceous material substantially inert to the glass in said ribbon and the metal in said bath at float temperatures floating on the surface of said bath at either side of said ribbon, and a feeder providing additional material to said layer from beneath the surface of said bath to maintain said layer thereon.

4. Apparatus as defined in claim 3 in which said cover is a layer of granular carbon floating on said bath.

References Cited

UNITED STATES PATENTS 3,356,475   12/1967   Loukes _____ 65—182 X

S. LEON BASHORE, Primary Examiner

R. L. LINDSAY, Jr., Assistant Examiner

U.S. Cl. X.R.

65—65, 99, 182, 184